3,689,405
SOLVENT EXTRACTION PROCESS
Armand J. De Rosset, Clarendon Hills, Ill., Richard C. Wackher, Forsyth, Mo., and Stephen N. Massie, Palatine, Ill., assignors to Universal Oil Products Company, Des Plaines, Ill.
No Drawing. Filed May 3, 1971, Ser. No. 139,972
Int. Cl. C07c 7/10; C10g 21/00
U.S. Cl. 208—326
8 Claims

ABSTRACT OF THE DISCLOSURE

A process for the separation of aromatic hydrocarbons from saturated hydrocarbons using a solvent comprising a succinimide in which a feed stock contacts the solvent at solvent extraction conditions. The resulting raffinate and extract phases are separated. The extract phase is thereafter subjected to treatment to remove aromatic hydrocarbons therefrom. The solvent may be recycled to the process for continuous use.

BACKGROUND OF THE INVENTION

Field of the invention

The present invention relates to a solvent extraction process in which aromatic hydrocarbons are separated and concentrated from feed stock containing both aromatic and saturated hydrocarbons.

Description of the prior art

References which relate to the process of this invention include Belgian Pat. No. 744,589, published on July 20, 1970, and West German application No. 1,545,225, filed on Jan. 30, 1965, and published on July 23, 1970. The above foreign references refer to the use of certain heterocyclic compounds which can be used as solvents in an extraction process.

SUMMARY OF THE INVENTION

Solvents which can be used in the process of this invention are generally derived from a general class of materials defined as "succinimides." The succinimides may be prepared conveniently by heating succinic acid, succinic anhydride or succinate esters with ammonia. The general structure of succinimide is shown in Equation 1 below:

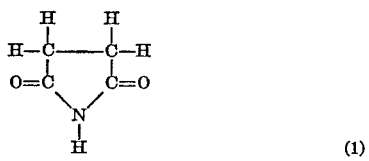

(1)

It is also included as within the scope of the claims of this invention that various derivatives of the base succinimide as described in Equation 1 above can be utilized. For instance, methyl, ethyl, butyl, propyl or even a pentyl homolog of the above compound either substituted at a carbon group or at the nitrogen group within the heterocyclic ring can be utilized as solvent in the process of this invention. Specifically, derivatives of the succinimides as represented in the formula below:

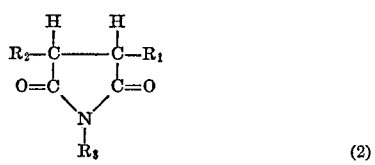

(2)

can be utilized as solvents in the process of this invention. The $R_1$, $R_2$ and $R_3$ substitutional groups are selected from hydrogen or an alkyl group of carbon number less than about 5.

Specific examples of succinimide type compounds which are included in the above formulas are succinimide, N-methylsuccinimide, N-2-dimethylsuccinimide, 2-methylsuccinimide, 2,3-dimethylsuccinimde, etc. In some instances, the melting points of the above compounds are high enough so that high temperatures must be used in the process in order to allow a liquefied operation to take place. In order to substantially reduce the probabilities of high melting points of the succinimides it is generally preferred that in instances where $R_1$ and $R_2$ are hydrogen that $R_3$ must be an alkyl group of four carbons or less in order to obtain a low melting point of the succinimide compound. Substitution at the nitrogen position may also be utilized to improve the solubility of hydrocarbons in the solvent.

The solvent which can be used in the process of this invention are preferably in a liquefied form and may be in admixture with quantities of other compounds including water or organic compounds to enhance the solvent's selectivity in extracting aromatics from the feed mixture. Specifically, the succinimide material may be diluted with various quantities of water, glycols including ethylene glycol and diethylene glycol, 4-methyl-1,3 dithiolane-1,1, 3,3-tetraoxide, M-methyl-2-pyrrolidone, 1,3-propane sultone, the sulfolanes or other organic compounds. The diluents should be soluble with the solvent and should enhance the extraction of aromatic hydrocarbons by the succinimide solvent. The quantity of the diluents which may be present in the solvent can vary anywhere from a few percent up to about 15 to 50 wt. percent of the solvent and may include both water and organics. Optimum quantities of the various inert diluents can be found by experimentation.

Solvent extraction conditions include liquid phase operations at temperatures anywhere from above about ambient temperatures up to and including 250° C. In many instances it is possible to operate in a liquid phase condition at a temperature below the melting point of the particular solvent used because of the depression of the solvent's freezing point by the inert diluent. Pressures should be maintained to enable liquid phase operations to take place.

Various contacting means can be utilized in the process of this invention to effect a solvent extraction. Rotating disc contacters can be used for solvent and feed stocks to contact one another in a countercurrent manner to effect intimate mixing. The extraction operation can be performed in a continuous type operation or in a batchwise separation. Specifically, feed stock and a solvent mixture can be allowed to contact each other for a certain period of time after which extract and raffinate phases are separated. Saturated components can be recovered from the raffinate phase and the aromatic component from the extract phase.

In many instances, the solvent which may be dissolved in the raffinate phase may be removed from the raffinate phase by fractionation or by water-washing in order to prevent undue solvent losses in the process. The extract phase can be passed into a fractionating column so the solvent may be separated from aromatic components. Diluents which are present in the solvent can also be separated from the solvent and aromatic components in the fractionator. Typical fractionation schemes include extractive distillation followed by a simple fractionation step in order to separate the extract phase from the solvent material. The solvent can be reused and passed into the extraction portion of the process after being mixed with the proper quantity of the organic diluent or water if either or both are desired to be used to enhance aromatic separation. In some instances the solvent may require further treatment to remove impurities derived from the feedstock or from the breaking down of solvent materials.

Feed stocks which can be used in the process of this invention include straight run gasolines and certain components from reforming, catalytic cracking, hydrocracking, or isomerization processes. Specifically, the feed stocks utilized in the process of this invention include both aromatic hydrocarbons and saturated hydrocarbons. The aromatics contemplated as feed stocks include mono- and poly-nuclear aromatics. Specifically aromatics which are contemplated as being components present in the feed stock of the process of this invention include benzene, toluene, ethylbenzene, para-xylene, meta-xylene, ortho-xylene, isopropylbenzene, normal propylbenzene, the diethylbenzenes, the trimethylbenzenes, the butylbenzenes, the methylpropylbenzenes, tetramethylbenzenes, the naphthalenes including alkyl derivatives thereof. Saturated hydrocarbons include straight or branched chain paraffins or cycloparaffins having from six up to twenty-five carbon atoms per molecule. The cycloparaffins which can be included as part of the feed stocks of this invention include methylcyclopentane, cyclohexane and the alkyl derivatives thereof. Other components such as olefins or diolefins may be present as minor constituent of the feed stocks. It is preferred that they not be in very high concentration and should be less than about 5 volume percent of the feed stock in order to reduce their undesirable influences on the process.

The aromatics, branched and straight chained paraffins, and the cycloparaffins can vary in concentration in a feed stock depending on the source of the feed stock.

PREFERRED EMBODIMENTS.—EXAMPLES

In this example a succinimide material was used to illustrate the process of this invention. The apparatus used consisted of a sealed bomb which could sustain a moderate amount of pressure and temperatures up to about 200° C. The bomb was filled with a feed stock consisting of about 80 vol. percent methylcyclopentane and 20 vol. percent benzene and the desired solvent and then shaken to cause intimate mixing of both the feed and solvent materials. The bomb was then placed in a constant temperature bath maintained at 121° C. The bomb was occasionally shaken after the contents of it had reached 121° C. After about one hour at 121° C. the contents of the bomb were sampled by drawing off raffinate (upper) and extract (lower) phases of liquid. The results of the experiment are shown in the Table I below:

The solvents used all contained at least one form of a succinimide or a derivative and are specifically described in Table II below:

TABLE II.—SOLVENT DESCRIPTIONS

| | Weight percent | Description |
|---|---|---|
| Solvent: | | |
| A1 | 100.0 | Succinimide. |
| A2 | 75.0 | Succinimide. |
| | 25.0 | Diethylene glycol. |
| A3 | 75.0 | Succinimide. |
| | 25.0 | 4-methyl-1,3 dithiolane-1,1,3,3-tetraoxide. |
| A4 | 50.0 | Succinimide. |
| | 50.0 | N-methyl-2-pyrrolidone. |
| A5 | 50.1 | Succinimide. |
| | 49.9 | 1,3-propane sultone. |
| B | 100.0 | N-methylsuccinimide. |
| C | 100.0 | 2-methylsuccinimide. |

The water content of the raffinate and extract phases was normalized out of the calculations. Water was added to the solvent in tests 1-6 as part of the normal testing procedure since water had been found to enhance many solvents' abilities to selectively concentrate aromatics in an extract phase.

The selectivities were found by calculating the ratio of the weight ratios of benzene over methylcyclopentane in the extract and raffinate phases respectively. In each case a selectivity greater than unity was found which indicated that each solvent would selectively concentrate aromatics in the extract phase.

In tests 1, 6, 7 and above, a single solvent was used to concentrate aromatics. In tests 2, 3, 4 and 5 succinimide or a derivative compound was mixed with another solvent to determine whether or not the specific combination would offer an advantageous separation.

The above examples are offered as specific embodiments of the process of this invention and are not to be taken as an undue limitation on the scope of the attached claims.

A broad embodiment of the present invention relates to a process for the separation of aromatic hydrocarbons from a mixture of aromatic and saturated hydrocarbons which process comprises contacting said mixture with a solvent containing a succinimide or derivative thereof at conditions to effect the concentration of the aromatic by said solvent and recovering the aromatic from the solvent.

We claim as our invention:

1. A process for the selective extraction of an aromatic hydrocarbon from a feed stock containing aromatic and saturated hydrocarbons which process comprises contact-

TABLE I.—TEST RESULTS

| | Test | | | | | | |
|---|---|---|---|---|---|---|---|
| | 1 | 2 | 3 | 4 | 5 | 6 | 7 |
| Solvent type | A1 | A2 | A3 | A4 | A5 | B | C |
| Solvent mixture: | | | | | | | |
| Solvent, grams | 85.05 | 100.04 | 98.00 | 95.06 | 98.04 | 84.10 | 102.49 |
| Water, grams | 15.57 | 2.04 | 2.10 | 5.03 | 1.97 | 9.29 | |
| Solvent, weight percent | 84.5 | 98.0 | 97.9 | 95.0 | 98.0 | 90.1 | 100.0 |
| Water, weight percent | 15.5 | 2.0 | 2.1 | 5.0 | 2.0 | 9.9 | |
| Feedstock: | | | | | | | |
| Benzene (BZ), grams | 6.30 | 5.94 | 6.15 | 7.56 | 6.21 | 7.51 | 5.46 |
| Methylcyclopentane (MCP), grams. | 25.52 | 24.04 | 23.85 | 27.42 | 26.13 | 28.61 | 22.26 |
| Bz, weight percent | 19.8 | 19.8 | 20.5 | 21.6 | 19.2 | 20.8 | 19.7 |
| MCP, weight percent | 80.2 | 80.2 | 79.5 | 78.4 | 80.8 | 79.2 | 80.3 |
| Raffinate phase sample: | | | | | | | |
| Solvent, grams | 0.19 | | 0.13 | 0.34 | 0.20 | 0.05 | 0.75 |
| Bz, grams | 0.75 | 0.77 | 1.19 | 0.65 | 1.50 | 0.47 | 0.80 |
| MCP, grams | 4.32 | 4.63 | 7.25 | 5.96 | 8.71 | 3.53 | 7.81 |
| Solvent, weight percent | 3.6 | | 1.5 | 4.9 | 1.9 | 1.2 | 8.0 |
| Bz, weight percent | 14.2 | 14.3 | 13.9 | 9.4 | 14.4 | 11.6 | 8.5 |
| MCP, weight percent | 82.2 | 85.7 | 84.6 | 85.7 | 83.7 | 87.2 | 83.5 |
| Extract phase sample: | | | | | | | |
| Solvent, grams | 73.28 | 29.14 | 69.37 | 48.57 | 57.30 | 70.63 | 64.78 |
| Bz, grams | 1.30 | 0.72 | 1.42 | 4.40 | 1.18 | 3.51 | 2.45 |
| MCP, grams | 0.50 | 0.48 | 0.72 | 2.21 | 0.64 | 4.60 | 5.26 |
| Solvent, weight percent | 97.6 | 96.0 | 97.0 | 88.0 | 96.9 | 89.8 | 89.4 |
| Bz, weight percent | 1.7 | 2.4 | 2.0 | 8.0 | 2.0 | 4.4 | 3.4 |
| MCP, weight percent | 0.7 | 1.6 | 1.0 | 4.0 | 1.1 | 5.8 | 7.2 |
| Selectivity (BZ/MCP) | 15.2 | 9.0 | 12.0 | 4.6 | 10.8 | 5.6 | 4.5 | ing said feed stock with a solvent containing a material having the formula:

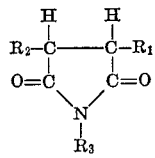

wherein $R_1$, $R_2$ and $R_3$ are selected from the group consisting of hydrogen or an alkyl group of carbon number less than 5, at solvent extraction conditions to effect the selective extraction of aromatic hydrocarbons by the solvent, recovering solvent and said selectively extracted aromatics and recovering said aromatics from said solvent.

2. Claim 1 further characterized in that said aromatic hydrocarbons contained from about 6 to about 15 carbon atoms per molecule.

3. Claim 1 further characterized in that said saturated hydrocarbons have from about 6 to about 20 carbon atoms per molecule.

4. Claim 1 further characterized in that said saturated hydrocarbons are cycloparaffins.

5. Claim 1 further characterized in that $R_1$, $R_2$, and $R_3$ are hydrogen.

6. Claim 1 further characterized in that $R_1$ is a methyl group and $R_2$ and $R_3$ are hydrogen.

7. Claim 1 further characterized in that $R_3$ is a hydrogen and $R_1$ and $R_2$ are methyl groups.

8. A process for the selective extraction of aromatic hydrocarbons selected from the group consisting of benzene, toluene, the xylenes and ethylbenzene from a feed stock containing aromatic hydrocarbons and saturated hydrocarbons which process comprises contacting feed stock with a solvent comprising material having the formula:

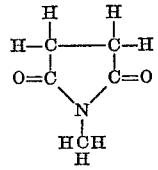

at solvent extraction conditions to effect the selective extraction of said aromatic hydrocarbons by said solvent, recovering solvent and said selectively extracted aromatics and recovering said selectively extracted aromatics from said solvent.

References Cited
UNITED STATES PATENTS

| | | | |
|---|---|---|---|
| 3,120,487 | 2/1964 | Norton et al. | 260—674 |
| 3,565,794 | 2/1971 | Pigache | 260—674 |
| 3,617,535 | 11/1971 | Weitz et al. | 208—326 |

DELBERT E. GANTZ, Primary Examiner

C. E. SPRESSER, Jr., Assistant Examiner

U.S. Cl. X.R.

208—323, 325; 260—674 SE